(12) United States Patent
Matsuoka et al.

(10) Patent No.: US 10,830,340 B2
(45) Date of Patent: Nov. 10, 2020

(54) HYDRAULIC PRESSURE CONTROL DEVICE AND HYDRAULIC PRESSURE CONTROL METHOD FOR VEHICLE

(71) Applicant: HITACHI AUTOMOTIVE SYSTEMS, LTD., Hitachinaka (JP)

(72) Inventors: Takashi Matsuoka, Tokyo (JP); Masashi Seimiya, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 33 days.

(21) Appl. No.: 16/463,431

(22) PCT Filed: Mar. 15, 2018

(86) PCT No.: PCT/JP2018/010152
§ 371 (c)(1),
(2) Date: May 23, 2019

(87) PCT Pub. No.: WO2018/173906
PCT Pub. Date: Sep. 27, 2018

(65) Prior Publication Data
US 2020/0325984 A1    Oct. 15, 2020

(30) Foreign Application Priority Data
Mar. 23, 2017 (JP) ................... 2017-057752

(51) Int. Cl.
*B60W 10/02* (2006.01)
*F16H 61/00* (2006.01)
(Continued)

(52) U.S. Cl.
CPC ....... *F16H 61/0009* (2013.01); *B60W 10/023* (2013.01); *B60W 10/06* (2013.01);
(Continued)

(58) Field of Classification Search
None
See application file for complete search history.

(56) References Cited

U.S. PATENT DOCUMENTS

| | | | |
|---|---|---|---|
| 5,720,692 A * | 2/1998 | Kashiwabara | .... F16H 61/66272 477/45 |
| 6,454,675 B2 * | 9/2002 | Asayama | ......... F16H 61/66272 477/45 |

(Continued)

FOREIGN PATENT DOCUMENTS

| | | |
|---|---|---|
| JP | H04-314633 A | 11/1992 |
| JP | 2001-304392 A | 10/2001 |

(Continued)

OTHER PUBLICATIONS

International Search Report with English translation and Written Opinion issued in corresponding application No. PCT/JP2018/010152 dated Jun. 26, 2018.

*Primary Examiner* — Dirk Wright
(74) *Attorney, Agent, or Firm* — Foley & Lardner LLP

(57) ABSTRACT

The present invention improves fuel efficiency of a vehicle and decreases a noise, by decreasing a margin value of a hydraulic pressure supplied to a hydraulic pressure control target and decreasing the hydraulic pressure supplied to the hydraulic pressure control target, when the vehicle is driven automatically. In a hydraulic pressure control device 1 for a vehicle that controls a line pressure or an operation pressure (hydraulic pressure) supplied to a clutch 40 or a transmission 41 (hydraulic pressure control target) provided in the vehicle, the hydraulic pressure control device 1 includes an operation pressure control unit 10 (hydraulic pressure setting device) that sets margin values $\alpha 1$ and $\alpha 2$ of the operation pressure (line pressure) supplied to hydraulic circuits 31 and 31 of the clutch 40 or the transmission 41, on the basis of a (Continued)

predetermined driving plan (refer to FIG. 2) in the case of driving the vehicle automatically.

7 Claims, 5 Drawing Sheets

(51) Int. Cl.
| | | |
|---|---|---|
| *B60W 10/06* | (2006.01) | |
| *B60W 10/103* | (2012.01) | |
| *B60W 10/30* | (2006.01) | |
| *F16H 59/14* | (2006.01) | |
| *F16H 59/02* | (2006.01) | |
| *F16H 61/02* | (2006.01) | |
| *F16H 59/60* | (2006.01) | |

(52) U.S. Cl.
CPC .......... *B60W 10/103* (2013.01); *B60W 10/30* (2013.01); *F16H 59/0204* (2013.01); *F16H 59/0208* (2013.01); *F16H 59/14* (2013.01); *F16H 61/0248* (2013.01); *F16H 59/60* (2013.01); *F16H 2061/0012* (2013.01); *F16H 2061/0015* (2013.01); *F16H 2061/0087* (2013.01)

(56) References Cited

U.S. PATENT DOCUMENTS

| | | | |
|---|---|---|---|
| 9,873,434 | B2 * | 1/2018 | Endo ................. B60W 30/1843 |
| 2001/0049315 | A1 | 12/2001 | Tsutsui |
| 2002/0004437 | A1 | 1/2002 | Asayama |
| 2016/0297444 | A1 | 10/2016 | Endo |

FOREIGN PATENT DOCUMENTS

| | | |
|---|---|---|
| JP | 2001-349418 A | 12/2001 |
| JP | 2007-071265 A | 3/2007 |
| JP | 2016-200179 A | 12/2016 |

\* cited by examiner

HYDRAULIC PRESSURE CONTROL DEVICE AND HYDRAULIC PRESSURE CONTROL METHOD FOR VEHICLE

TECHNICAL FIELD

The present invention relates to a hydraulic pressure control device and a hydraulic pressure control method for a vehicle.

BACKGROUND ART

In an automatic transmission and the like of a vehicle, control of a clutch and a transmission is performed by a hydraulic pressure.

For example, in a belt-type continuously variable transmission (CVT) to be a type of automatic transmission, the tension of a belt stretched between a primary pulley and a secondary pulley and the fastening force of the clutch such as a forward-reverse switching mechanism are controlled by the hydraulic pressure.

This type of vehicle generates the hydraulic pressure required by an oil pump. However, in order to speed up responsiveness of hydraulic pressure control, a sufficiently large hydraulic pressure (hereinafter, referred to as an operation pressure) is generated in advance. By valve control, a hydraulic pressure (hereinafter, referred to as a line pressure) of the necessary magnitude is supplied to a hydraulic pressure control target (a belt tension adjustment mechanism or a clutch fastening mechanism).

In consideration of a sudden variation in the line pressure required by the hydraulic pressure control target due to a sudden operation of an accelerator or the like by a driver or a variation in performance of the oil pump, the operation pressure generated by the oil pump is set to a value higher by a predetermined margin value than the line pressure required by the hydraulic pressure control target.

However, when the operation pressure generated by the oil pump is maintained at a high value, the oil pump should be operated more. As a result, an operation load of an engine for operating the oil pump increases, fuel efficiency of the engine is deteriorated, and a noise increases.

Here, PTL 1 discloses a technology for reducing the margin value of the line pressure and decreasing an operation of the oil pump, when the necessary line pressure can be reduced by engine control, and increasing the margin value of the line pressure only when the necessary line pressure cannot be reduced by the engine control.

Further, PTL 2 discloses a technology for monitoring a slip of the belt stretched between the primary pulley and the secondary pulley, and increasing the margin value of the line pressure only when the slip of the belt occurs.

CITATION LIST

Patent Literature

PTL 1: JP 2001-304392 A
PTL 2: JP 2001-349418 A

SUMMARY OF INVENTION

Technical Problem

However, according to the technologies disclosed in PTL 1 and PTL 2, the line pressure is controlled on the basis of a current state such as an operation state of the engine and a slip state of the belt, and it is necessary to generate a sufficiently large operation pressure to cope with the sudden operation of the accelerator or the like by the driver.

For this reason, the operation of the oil pump should be increased, the fuel efficiency of the engine is deteriorated according to the increase in the operation load of the engine, and the noise increases.

On the other hand, in recent years, development of a vehicle having an automatic driving mode is advanced. When the vehicle is driven automatically, the operation of the accelerator or the like which the driver has performed thus far in the case of manual driving is automatically performed by determination of the vehicle side, on the basis of a predetermined driving plan of the vehicle.

As described above, in the vehicle having the automatic driving mode, future information such as an engine output variation, a shift change, and a brake output of the vehicle can be obtained in advance by the driving plan. However, if the conventional method of controlling the operation pressure in the manual driving is simply applied to the vehicle having the automatic driving mode, the future information is not used for control of the operation pressure. As a result, similarly to the case of the manual driving, it is necessary to generate the operation pressure to which the large margin value has been added.

For this reason, in this type of vehicle, since the necessary operation pressure increases by the margin value, the operation load of the engine increases to generate the large operation pressure, thereby lowering the fuel efficiency of the engine and increasing the noise.

Accordingly, the present invention has been made in view of the above problems and an object thereof is to improve fuel efficiency of a vehicle and decrease a noise, by decreasing a margin value of a hydraulic pressure supplied to a hydraulic pressure control target and decreasing the hydraulic pressure supplied to the hydraulic pressure control target, when the vehicle is driven automatically.

Solution to Problem

In order to achieve the above object, in a hydraulic pressure control device for a vehicle for controlling a hydraulic pressure supplied to a hydraulic pressure control target provided in the vehicle, the hydraulic pressure control device includes a hydraulic pressure setting device which sets a margin value of the hydraulic pressure supplied to the hydraulic pressure control target, on the basis of a predetermined driving plan in the case of driving the vehicle automatically.

Advantageous Effects of Invention

According to the present invention, a hydraulic pressure setting device sets a margin value of a hydraulic pressure supplied to a hydraulic pressure control target, on the basis of a predetermined driving plan in automatic driving. Therefore, the margin value can be decreased. As a result, it is possible to reduce the hydraulic pressure supplied to the hydraulic pressure control target, and it is possible to improve fuel efficiency of a vehicle and reduce a noise, in accordance with the amount of reduction in the hydraulic pressure.

DESCRIPTION OF EMBODIMENTS

[Hydraulic Pressure Control Device]

Hereinafter, embodiments of the present invention will be described on the basis of the drawings.

Figure 1:
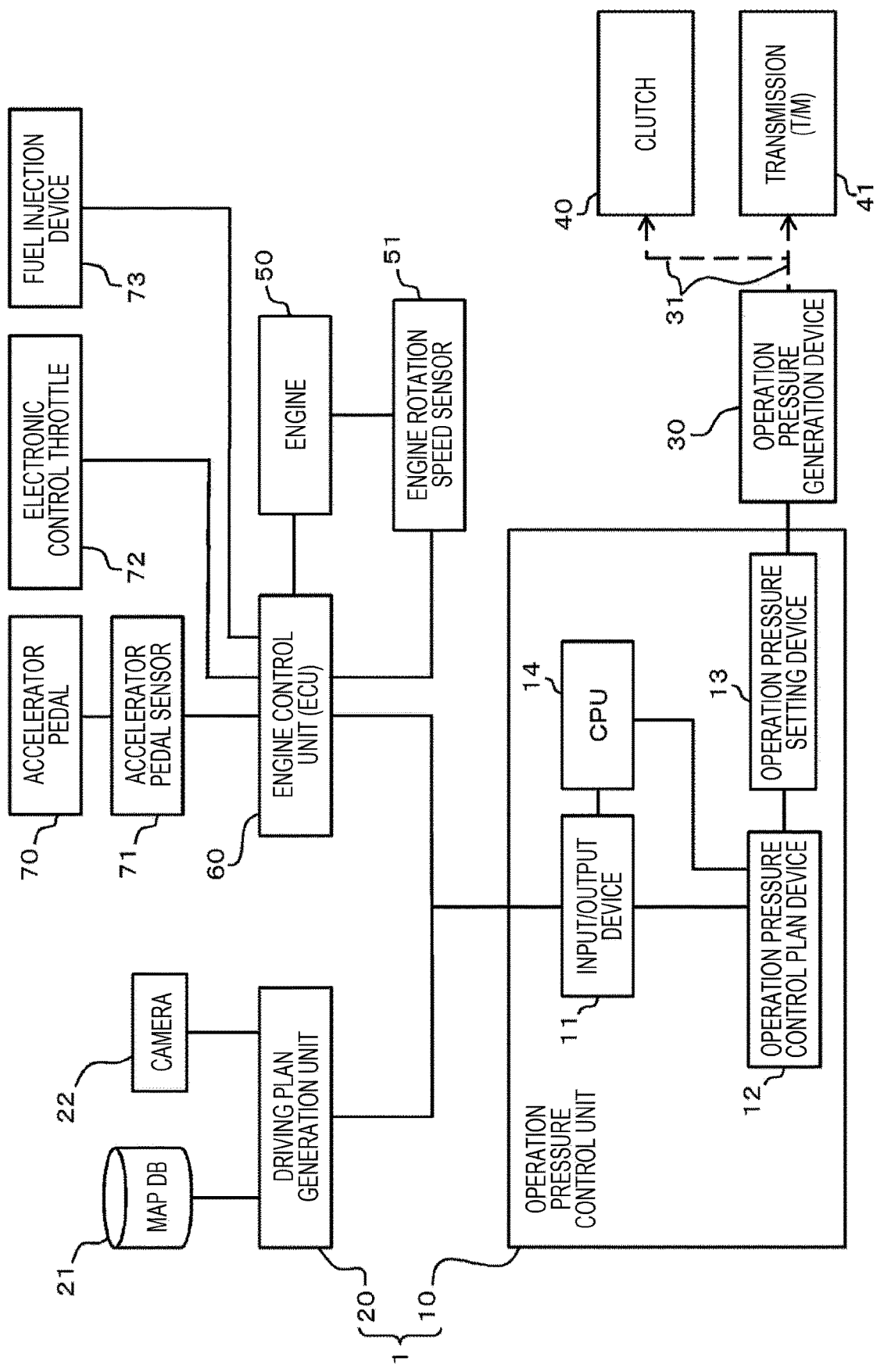
FIG. 1 is a block diagram illustrating a hydraulic pressure control device according to an embodiment.

FIG. 1 is a block diagram illustrating a hydraulic pressure control device 1 of a vehicle according to an embodiment.

Figure 2:
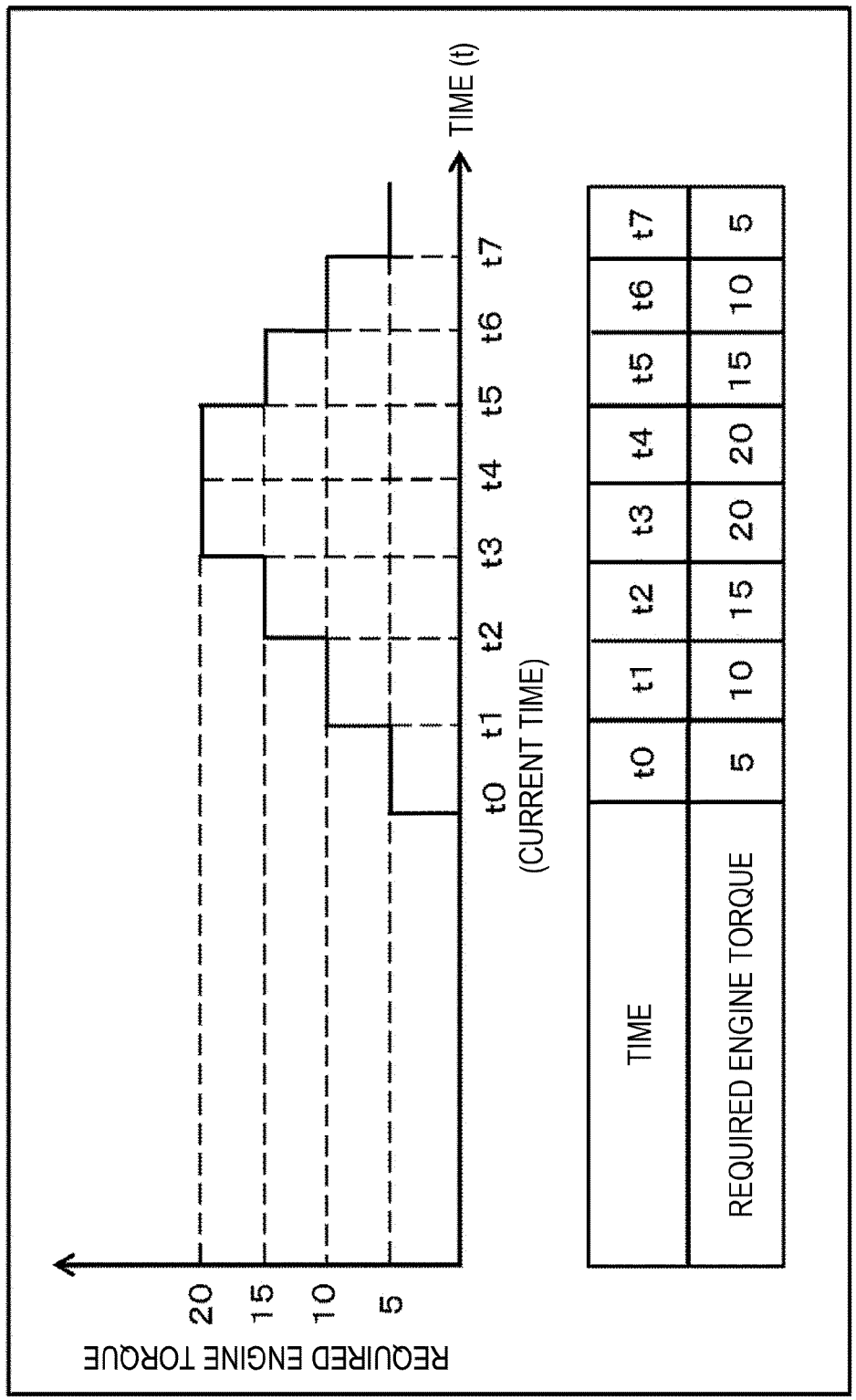
FIG. 2 is a diagram illustrating an example of driving plan data.

FIG. 2 is a diagram illustrating an example of driving plan data, and shows required engine torque at a future time later than a current time t0 at predetermined time intervals (t1 to t7), on the basis of the current time.

As shown in FIG. 1, a vehicle is provided with a hydraulic pressure control device 1 (an operation pressure control unit 10 and a driving plan generation unit 20), an operation pressure generation device 30 for generating an operation pressure required for a clutch 40 and a transmission 41, an engine 50 to be a drive source of the vehicle, and an engine control unit (ECU) 60 for controlling the engine 50.

The engine 50 is described by exemplifying the case of a gasoline engine. However, the present invention is not limited thereto and any engine that becomes the drive source of the vehicle may be used. For example, a diesel engine, a natural gas engine, an electric motor, or a combination thereof may be used.

The engine control unit 60 is a control device that performs overall control of the engine 50. For example, the engine control unit 60 controls engine torque of the engine 50, according to an operation of an accelerator pedal 70 by a driver.

An engine rotation speed sensor 51 for measuring a rotation speed of the engine 50, an electronic control throttle 72 for adjusting an intake air amount of the engine 50, and a fuel injection device 73 for injecting an appropriate amount of fuel on the basis of the intake air amount are connected to the engine control unit 60.

The engine control unit 60 adjusts the intake air amount, the fuel amount, the ignition timing, and the like by the electronic control throttle 72 and the fuel injection device 73, thereby controlling the torque of the engine 50 with high accuracy.

As the fuel injection device 73, a fuel injection device using an intake port injection system for injecting the fuel into an intake port (not shown in the drawings) of the engine or a fuel injection device using a cylinder injection system for directly injecting the fuel into a cylinder (not shown in the drawings) of the engine can be adopted.

By comparing driving regions required for the engine (regions determined on the basis of the engine torque and the engine rotation speed) and considering reduction of the fuel and good exhaust performance, it can be determined which of the intake port injection system and the cylinder injection system is adopted.

Further, an accelerator pedal sensor 71 for detecting an operation (depression amount) of the accelerator pedal 70 by the driver (not shown in the drawings) is connected to the engine control unit 60.

The engine control unit 60 controls the engine torque of the engine 50 according to the depression amount of the accelerator pedal 70 of the driver detected by the accelerator pedal sensor 71, in a manual driving mode.

Further, the engine control unit 60 switches (overrides) an automatic driving mode to the manual driving mode at timing when the accelerator operation of the driver is detected by the accelerator pedal sensor 71, in the automatic driving mode.

As such, an output signal of the accelerator pedal sensor 71 functions as a trigger for overriding from the automatic driving mode to the manual driving mode.

As the trigger for switching from the automatic driving mode to the manual driving mode, in addition to the operation of the accelerator pedal 70 by the driver, an operation of a steering wheel (not shown in the drawings) by the driver, an operation of a brake pedal (not shown in the drawings) by the driver, and the like are also considered. As the trigger, detection of each operation by a corresponding sensor may be used.

The vehicle is provided with the driving plan generation unit 20 for generating driving plan data (refer to FIG. 2) in the case of automatically driving the vehicle in the automatic driving mode. A map database (map DB 21) in which map data is stored and a camera 22 for photographing the surroundings of the vehicle are connected to the driving plan generation unit 20.

The map DB 21 stores map data around the vehicle including at least a range from a current position of the vehicle to the destination, and the map data stored in the map DB 21 is appropriately read by the driving plan generation unit 20.

As another method of acquiring the map data, for example, the map data may be acquired by a global positioning system (GPS) mounted on a general vehicle.

The camera 22 photographs the surroundings of the vehicle at predetermined time intervals and acquires photographed image data.

The camera 22 can use a stereo camera or the like used in an advanced driver assistance system (ADAS) for assisting driving of the vehicle by the driver, for example.

The driving plan generation unit 20 automatically or manually determines a traveling route for the destination set by the driver. The driving plan generation unit 20 generates time series information (driving plan data) at constant time intervals, such as the engine torque required for the vehicle to travel along the determined traveling route, by using information of the map DB 21 and the camera 22.

In the embodiment, the driving plan generation unit 20 reads the map data stored in the map DB 21 and detects a road situation in front of the vehicle, on the basis of the photographed image data in front of the vehicle, photographed by the camera 22.

Specifically, the driving plan generation unit 20 calculates a road gradient from the map data and the photographed image data. In addition, the driving plan generation unit 20 generates driving plan data by calculating the engine torque (required engine torque) necessary for traveling of the vehicle at each future time, on the basis of the road gradient.

As shown in FIG. 2, the driving plan data according to the embodiment is an driving plan for outputting required engine torque 5 at a time t0 (current time). Similarly, the driving plan data is a driving plan for outputting required pieces of engine torque 10, 15, 20, 20, 15, 10, and 5 at t1, t2, t3, t4, t5, t6, and t7 to be times later than the time t0, respectively.

Even when the driving plan generation unit 20 generates the driving plan data once, the driving plan generation unit 20 can continuously change (updates) the driving plan data each time by feeding back a current vehicle state (such as the road gradient).

Returning to FIG. 1, the operation pressure control unit 10 is connected to the driving plan generation unit 20. The operation pressure control unit 10 is also connected to the engine control unit 60 described above, and controls the hydraulic pressure (operation pressure) required for hydraulic pressure control targets such as the clutch 40 and the transmission (T/M) 41, on the basis of the driving plan data generated by the driving plan generation unit 20 and the engine state acquired by the engine control unit 60.

The operation pressure control unit 10 includes an input/output device 11 that transmits and receiving data to and from other units, an operation pressure control plan device 12 that generates the control plan data of the operation pressure required for the hydraulic pressure control target, and an operation pressure setting device 13 that generates an operation pressure indication value obtained by adding a predetermined margin value to the operation pressure planned by the control plan data of the operation pressure.

The operation pressure control unit 10 further includes a central processing unit (CPU) 14 that performs overall control of the operation pressure control unit 10 and a ROM (not shown in the drawings) that stores a control program for performing overall control of the operation pressure control unit 10. The CPU 14 executes the control program stored in the ROM, so that functions of the input/output device 11, the operation pressure control plan device 12, and the operation pressure setting device 13 are exhibited.

The input/output device 11 is an input/output device having an I/O port and is connected to the driving plan generation unit 20 and the engine control unit 60.

The input/output device 11 acquires the driving plan data of the vehicle generated by the driving plan generation unit 20 and acquires a state of the engine 50 via the engine control unit 60.

In the case of the automatic driving mode of the vehicle, the operation pressure control plan device 12 acquires the driving plan data (refer to FIG. 2) generated by the driving plan generation unit 20 via the input/output device 11. The operation pressure control plan device 12 generates operation pressure control plan data of time series from the current time to the future time, of the operation pressure (required operation pressure L3 shown in the lower diagram of FIG. 4) generated by the operation pressure generation device 30, on the basis of the driving plan data (required engine torque) acquired from the driving plan generation unit 20.

In order to reduce a resource amount of the ROM (not shown in the drawings) or the like of the operation pressure control unit 10, for the operation pressure control plan data generated by the operation pressure control plan device 12, instead of generating all operation pressure control plan data from all driving plan data from the current position of the vehicle to the destination, it is preferable to generate operation pressure control plan data several seconds ahead from driving plan data several seconds ahead.

In the embodiment, if the hydraulic pressure control device 1 acquires future information (operation pressure control plan data) up to one second ahead, the hydraulic pressure control device 1 can previously control the operation pressure of the hydraulic pressure control target such as the clutch 40 via the operation pressure generation device 30. Therefore, the operation pressure control plan device 12 may generate operation pressure control plan data up to one second ahead, on the basis of driving plan data of a future time one second ahead from the current time.

However, in the case where the responsiveness of the operation pressure control unit 10 or the operation pressure generation device 30 is poor, the operation pressure control plan device 12 generates operation pressure control plan data with a longer future time. As a result, even when the increase of the operation pressure is suddenly required, a time required for the pressure increase can be secured in advance, and it is possible to prevent the operation pressure (required operation pressure L3 shown in the lower diagram of FIG. 4) required for the hydraulic pressure control target from exceeding the operation pressure (control operation pressure L2 shown in the lower diagram of FIG. 4) generated by the operation pressure generation device 30.

The operation pressure control plan data generated by the operation pressure control plan device 12 is transmitted to the operation pressure setting device 13.

Figure 4:
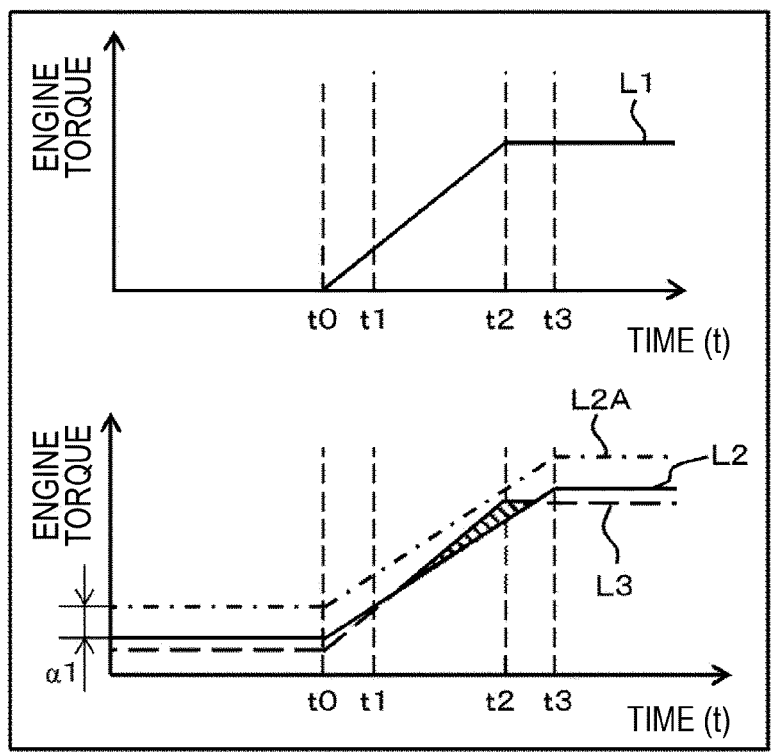
FIG. 4 is a diagram illustrating an example of conventional operation pressure control that does not use future information.

The operation pressure setting device 13 generates an operation pressure indication value (refer to a control operation pressure L2A shown in the lower diagram of FIG. 4) obtained by adding a predetermined margin value ($\alpha 1$ shown in FIG. 4 and $\alpha 2$ shown in FIG. 5) to the control operation pressure L2 (refer to the lower diagram of FIG. 4) of the operation pressure generation plan data, on the basis of the operation pressure control plan data generated by the operation pressure control plan device 12.

In addition, the operation pressure setting device 13 transmits the operation pressure indication value to the operation pressure generation device 30.

The operation pressure generation device 30 is an oil pump capable of generating a predetermined hydraulic pressure, and generates a predetermined operation pressure on the basis of the operation pressure indication value transmitted from the operation pressure setting device 13.

The operation pressure generation device 30 is not limited to the oil pump, for example, as long as it can generate the predetermined hydraulic pressure. However, when the operation pressure generation device 30 is the oil pump, the oil pump is driven by the engine 50.

For this reason, in order to drive the oil pump, a drive force or electric power of the engine 50 is consumed and a noise according to an operation of the engine 50 occurs. Therefore, when the operation pressure generation device 30 is the oil pump, it is desirable to reduce driving of the operation pressure generation device 30 (oil pump).

The hydraulic pressure control targets such as the clutch 40 and the transmission 41 are connected to the operation pressure generation device 30 via hydraulic circuits 31 and 31.

A spool valve (not shown in the drawings) to adjust a line pressure supplied to hydraulic chambers (hydraulic pressure control targets) of the clutch 40 and the transmission 41 is provided in the middle of the hydraulic circuits 31 and 31.

The spool valve generates the line pressure required by the clutch 40 and the transmission 41 from the operation pressure generated by the operation pressure generation device 30.

In the embodiment, one or more hydraulic pressure control targets exist in the clutch 40 and the transmission 41. Each hydraulic pressure control target is provided with the spool valve on the input side and the output side of the operation pressure, and the line pressure required for each control target is realized by opening or closing the spool valve.

The operation pressure is a source of the line pressure required for each hydraulic pressure control target. When a plurality of hydraulic pressure control targets are connected to the operation pressure generation device 30, the operation pressure generated by the operation pressure generation device 30 needs to maintain a pressure equal to or higher than a highest operation pressure in the connected hydraulic pressure control targets.

The operation pressure control unit 10 and the driving plan generation unit 20 described above constitute the hydraulic pressure control device 1 of the present invention.

[Hydraulic Pressure Control Method]

Next, a method of controlling an operation pressure by the hydraulic pressure control device 1 will be described.

Figure 3:
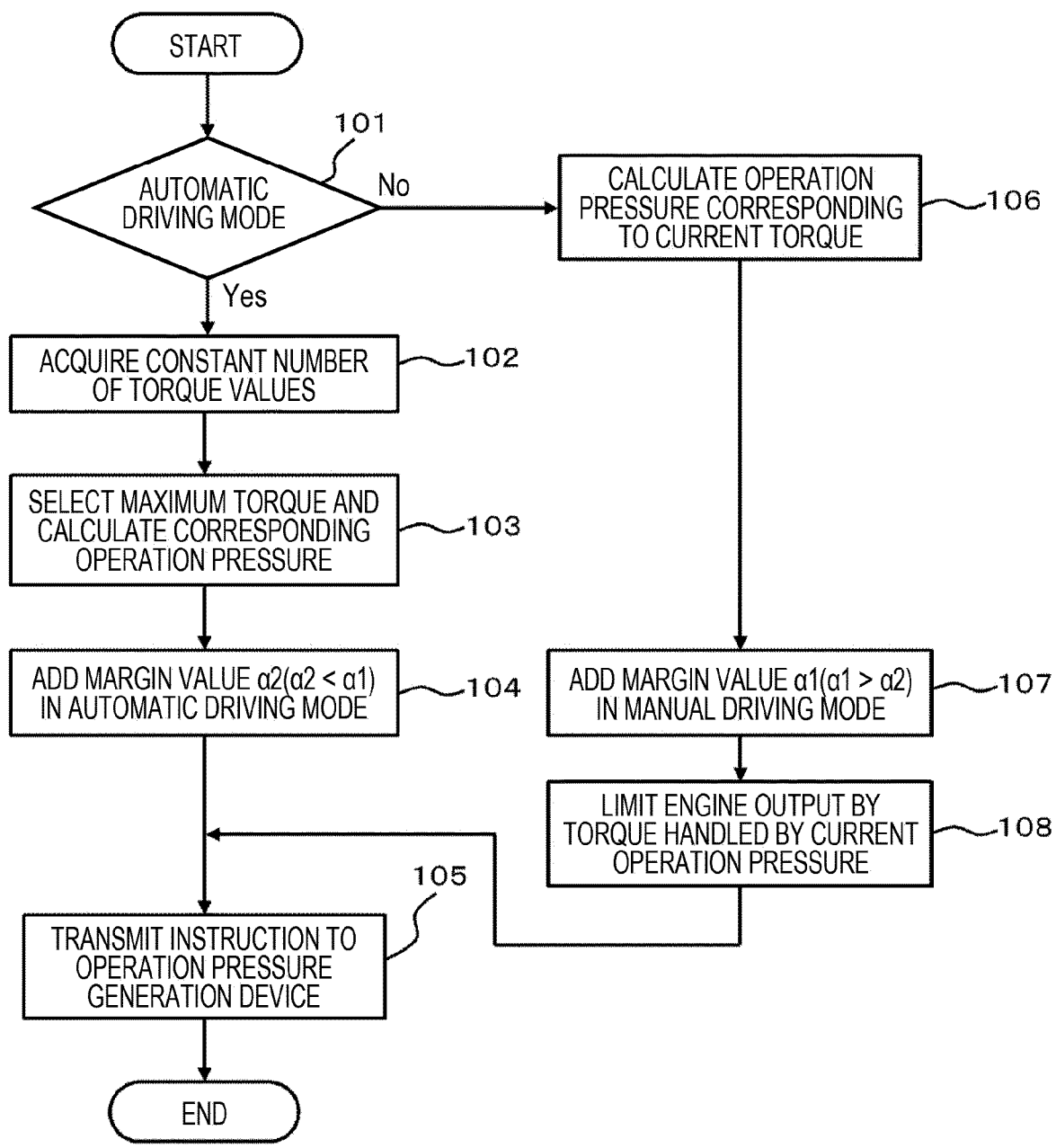
FIG. 3 is a flowchart of a hydraulic pressure control method according to an embodiment.

FIG. 3 is a flowchart illustrating a method of controlling an operation pressure.

Control processing (control flow) of the operation pressure is processing realized by executing the control program (not shown in the drawings) stored in the ROM (not shown in the drawings) by the CPU 14 in the operation pressure control unit 10. The control processing (control flow) of the operation pressure is repeatedly performed in a cycle of about 10 to 100 msec in the CPU 14.

First, in step 101, the CPU 14 of the operation pressure control unit 10 determines whether the vehicle is in the automatic driving mode or the manual driving mode.

The CPU 14 of the operation pressure control unit 10 acquires determination information on whether the vehicle is in the automatic driving mode or the manual driving mode, and when it is determined that the vehicle is in the automatic driving mode (step 101: Yes), the processing proceeds to step 102.

In step 102, the operation pressure control plan device 12 of the operation pressure control unit 10 acquires driving plan data (required pieces of engine torque) of a constant number of vehicles generated by the driving plan generation unit 20 via the input/output device 11, and the processing proceeds to step 103.

In the embodiment, as shown in FIG. 2, the operation pressure control plan device 12 acquires 8 (t0 to t7) required pieces of engine torque necessary for hydraulic pressure control of the clutch 40 or the transmission 41 as the driving plan data, at constant time intervals from the current time to the future time. As such, the information acquired at the constant time intervals from the current time to the future time is called future information.

Here, the number of future information acquired by the operation pressure control plan device 12 at one time is limited by a memory (RAM or the like) of the operation pressure control unit 10. However, the number of future information may be the number in which the operation pressure control unit 10 can acquire future information on a future time later than a time (for example, one second) where it is possible to appropriately control the operation pressure of the hydraulic pressure control target after acquiring the future information, in consideration of the responsiveness of the hydraulic circuit.

For example, all future information on the driving plan from the current position to the destination may be acquired at one time, and the number of pieces of future information may be the number according to the capacity of the memory of the operation pressure control unit 10 (for example, future information up to a total of one second (five every 200 msec) ahead.

In step 103, the operation pressure control plan device 12 selects the maximum required engine torque from the constant number of required pieces of engine torque from the current time to the future time, acquired in step 102 and calculates the maximum value of the selected required engine torque as the operation pressure control plan data, and the processing proceeds to step 104.

Here, a method of calculating the operation pressure control plan data by the operation pressure control plan device 12 will be described.

As shown in FIG. 2, the driving plan data generated by the driving plan generation unit 20 is planned to output the required pieces of engine torque 5 at the time t0 (current time). Similarly, the driving plan data is planned to output the required pieces of engine torque 10, 15, 20, 20, 15, 10, and 5 at t1, t2, t3, t4, t5, t6, and t7 to be times later than the time t0, respectively.

In the embodiment, the operation pressure control plan device 12 calculates the operation pressure control plan data by using the required pieces of engine torque at any three times, among the required pieces of engine torque from the current time t0 to the future times t1 to t7.

The operation pressure control plan device 12 acquires data 5, 10, and 15 of the required pieces of engine torque at the three times t0, t1, and t2 including the future time, at the current time t0. Next, the operation pressure control plan device 12 calculates, as the operation pressure control plan data, the data 15 of the largest required engine torque among values of the acquired required pieces of engine torque at the three times.

As described above, the operation pressure control plan device 12 calculates the value of the largest required engine torque at the predetermined future time as the operation pressure control plan data. As a result, at the time of a pressure increase and a pressure decrease, an actual operation pressure (control operation pressure L2 shown in the lower diagrams of FIGS. 5 and 6) generated by the operation pressure generation device 30 on the basis of the operation pressure control plan data becomes larger than an operation pressure (required operation pressure L3 shown in the lower diagrams of FIGS. 5 and 6) required for transmitting the required engine torque L1.

In step 104, the operation pressure setting device 13 adds a predetermined margin value to the operation pressure control plan data calculated in step 103, and the processing proceeds to step 105.

For example, due to a sensor error by aging or the like, the actual operation pressure (control operation pressure L2) generated by the operation pressure generation device 30 may be smaller than the operation pressure based on the operation pressure control plan data calculated by the operation pressure control plan device 12. Therefore, in the operation pressure setting device 13, the predetermined margin value ($\alpha 1$ shown in FIG. 4 and $\alpha 2$ shown in FIG. 5) is added to the operation pressure control plan data calculated by the operation pressure control plan device 12 to obtain an operation pressure indication value.

Since the margin value $\alpha 2$ (refer to FIG. 5) added during automatic driving does not need to correspond to a driver's sudden operation (for example, accelerator depression, brake operation, and steering operation), the margin value can become smaller than the margin value $\alpha 1$ (refer to FIG. 4) added at the time of the manual driving.

Figure 5:
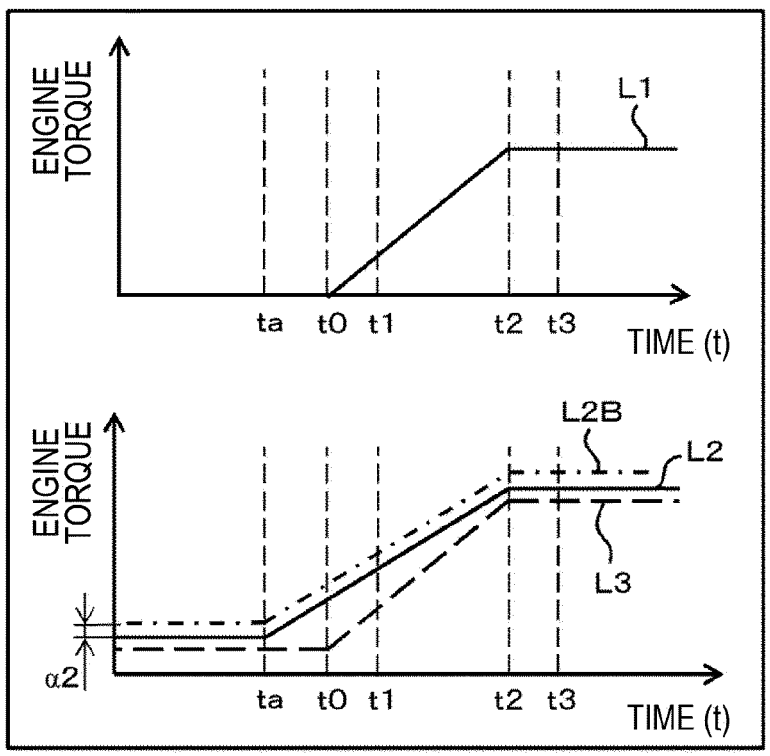
FIG. 5 is a diagram illustrating an example of operation pressure control according to the present embodiment that uses future information.

In step 105, the operation pressure setting device 13 transmits the operation pressure indication value (refer to the control operation pressure L2A shown in the lower diagram of FIG. 5), which is obtained by adding the margin value $\alpha 2$ (refer to FIG. 5) in the automatic driving mode, to the operation pressure generation device 30, and ends the processing.

Here, when it is determined in step 101 that the driving mode is not the automatic driving mode (manual driving mode) (step 101: No), the processing proceeds to step 106 and the CPU 14 of the operation pressure control unit 10 calculates the operation pressure (required operation pressure L3 shown in FIG. 4) to transmit the required engine torque at the current time t0.

In the manual driving mode, the operation pressure control unit 10 cannot use the driving plan data generated by the driving plan generation unit 20. Therefore, the operation pressure control unit 10 detects the depression amount of the accelerator pedal 70 by the driver at the current time t0 by the accelerator pedal sensor 71 via the engine control unit 60, and acquires the required engine torque corresponding to the depression amount of the accelerator pedal 70.

In step 106, the operation pressure control plan device 12 calculates the operation pressure (required operation pressure L3) required for the operation of the clutch 40 and the transmission 41 from the required engine torque at the current time t0, acquired by the CPU 14 from the engine control unit 60, and sets it as the operation pressure control plan data, and the processing proceeds to step 107.

In step 107, the operation pressure setting device 13 adds the margin value $\alpha 1$ in the manual driving mode to the operation pressure control plan data (required engine torque) calculated in step 106, and the processing proceeds to step 108.

Here, in order to prepare for the variation of the required engine torque due to the driver's sudden operation (for example, accelerator depression, brake operation, and steering operation) in addition to a sensor error due to aging and the like, the margin value $\alpha 1$ in the manual driving mode to be added in step 107 is set as a value larger than the margin value $\alpha 2$ to be added in the automatic driving mode in step 104 ($\alpha 1 > \alpha 2$).

Figure 7:
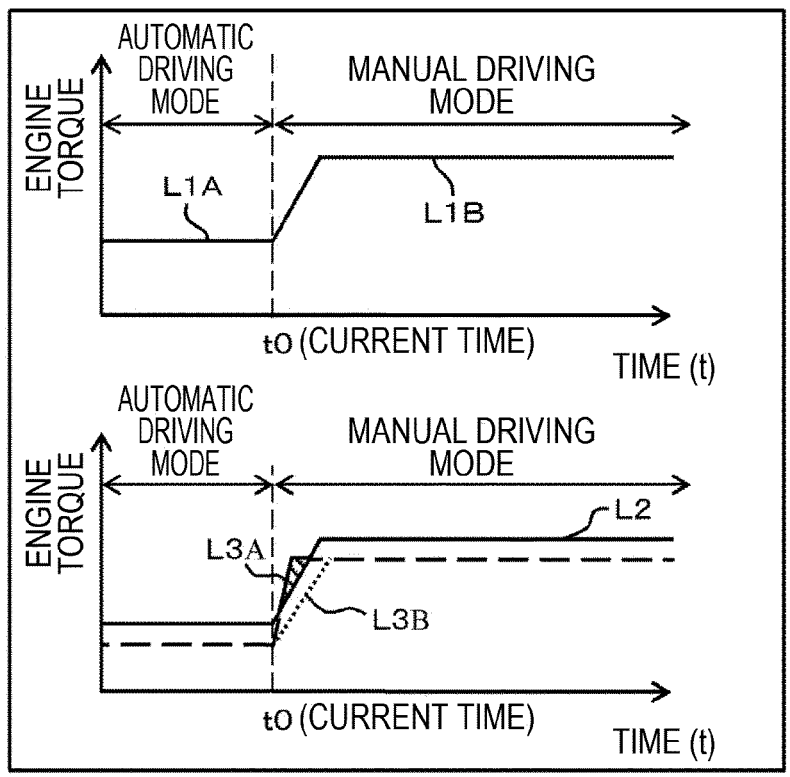
FIG. 7 is a diagram illustrating an example of operation pressure control according to the present embodiment that uses future information.

Step 108 is processing to be executed in preparation for the case where the actual operation pressure (required operation pressure L3A shown in the lower diagram of FIG. 7) generated by the operation pressure generation device 30 exceeds the operation pressure (control operation pressure L2 shown in the lower diagram of FIG. 7) required for transmitting the required engine torque (hatching portion shown in the lower diagram of FIG. 7).

The CPU 14 of the operation pressure control unit 10 calculates allowable required engine torque from the actual operation pressure (required operation pressure) generated by the operation pressure generation device 30 at the current time (t0), and transmits a value thereof to the engine control unit 60 via the input/output device 11.

In the engine control unit 60, the engine 50 is controlled so that the required operation pressure becomes equal to or smaller than the control operation pressure for transmitting the allowable required engine torque, regardless of the presence or absence of the sudden operation of the clutch or the like by the driver. As a result, the actual operation pressure (required operation pressure L3B shown in the lower diagram of FIG. 7) generated by the operation pressure generation device 30 is prevented from exceeding the operation pressure (control operation pressure L2 shown in the lower diagram of FIG. 7) required for transmitting the required engine torque.

Even in the manual driving mode, in step 105, the operation pressure setting device 13 of the operation pressure control unit 10 transmits the operation pressure indication value obtained by adding the margin value $\alpha 1$ in the manual driving mode to the operation pressure control plan data (required engine torque), to the operation pressure generation device 30, and ends the processing.

[Control of Operation Pressure by Hydraulic Pressure Control Device: Manual Driving Mode]

Next, control of the operation pressure by the hydraulic pressure control device 1 will be described.

FIG. 4 is a diagram illustrating an example of conventional operation pressure control which does not use future information. In FIG. 4, an upper diagram shows required engine torque L1, a solid line in the lower diagram shows an actual control operation pressure L2 generated by the operation pressure generation device 30, and a broken line shows a required operation pressure L3 necessary for transmitting the required engine torque L1.

In the lower diagram, a control operation pressure L2A after adding the margin value $\alpha 1$ to the control operation pressure L2 is shown by a one-dotted chain line.

Figure 6:
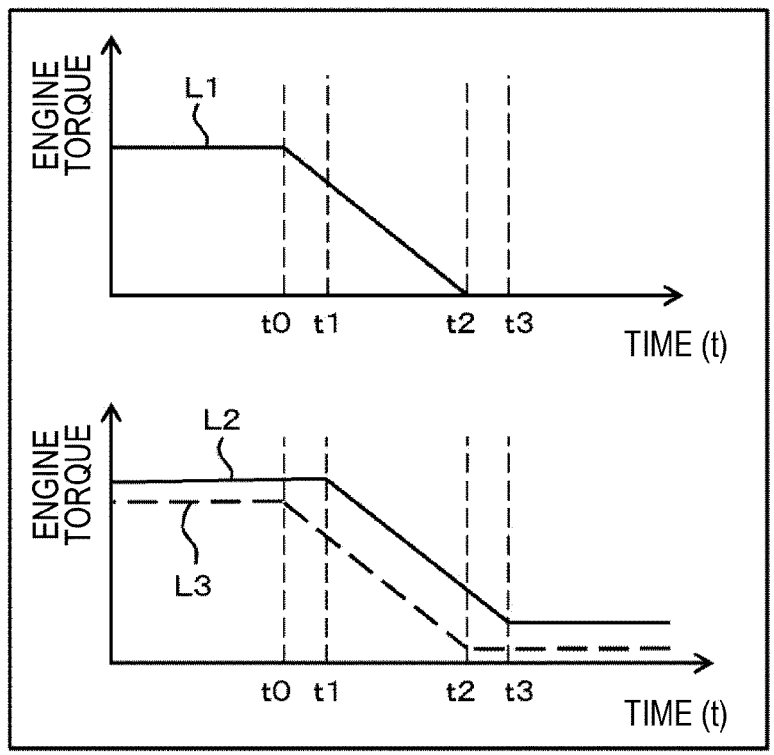
FIG. 6 is a diagram illustrating an example of operation pressure control according to the present embodiment that uses future information.

FIGS. 5 to 7 are diagrams illustrating an example of the operation pressure control according to the embodiment of the present invention that uses the future information. In FIGS. 5 to 7, an upper diagram shows the required engine torque L1, a solid line in the lower diagram shows the actual control operation pressure L2 generated by the operation pressure generation device 30, and a broken line shows the required operation pressure L3 (L3A and L3B) necessary for transmitting the required engine torque L1.

In the lower diagram, the control operation pressure L2B after adding the margin value $\alpha 2$ to the control operation pressure L2 is shown by a one-dotted chain line.

A solid line in the lower diagram of FIG. 7 shows the control operation pressure L2, a broken line shows the required operation pressure L3A when the required engine torque is not suppressed, and a one-dotted chain line shows the required operation pressure L3B when the engine torque is suppressed.

In the conventional example carried out in the manual driving mode, as shown in FIG. 4, since the operation pressure control plan device 12 of the operation pressure control unit 10 does not use future information on the required engine torque at a future time later than the current time, only the required engine torque L1 at the current time can be known at each time. The required engine torque L1 at the current time is a value calculated by the engine control unit 60 on the basis of the depression amount of the accelerator pedal 70 by the driver, detected by the accelerator pedal sensor 71.

The CPU of the operation pressure control unit 10 performs control to start to increase the control operation pressure L2 generated by the operation pressure generation device 30, at timing of the time t0 when the required operation pressure L3 necessary for transmitting the required engine torque L1 varies.

Here, when the required operation pressure L3 exceeds the control operation pressure L2 generated by the operation pressure generation device 30 due to the increase of the required operation pressure L3 (L3>L2), the operation pressure generation device 30 may not be able to generate the operation pressure required by the hydraulic pressure control target (refer to the hatching portion in the lower diagram of FIG. 4).

In the conventional example shown in FIG. 4, the required operation pressure L3 necessary for transmitting the required engine torque L1 exceeds the control operation pressure L2 generated by the operation pressure generation device 30, due to the sudden operation or the like of the driver during the current times t1 to t3. For this reason, for example, when the fastening force of the clutch 40 is controlled, the fastening force of the clutch 40 becomes weak and the slip occurs in the clutch 40. As a result, a sense of discomfort of the automatic driving may be given to the driver.

Further, when the belt tension of a belt-type continuously variable transmission is controlled, the belt may be damaged and traveling of the vehicle cannot be continued.

For this reason, in the conventional technology in which the future information is not used to control the operation pressure, the hydraulic pressure control device performs control so that the operation pressure generation device 30 generates the control operation pressure L2A (one-dotted chain line in the lower diagram of FIG. 4) to which the margin value $\alpha 1$ is added, so as to prevent the control operation pressure L2 from exceeding the required operation pressure L3, even when there is the sudden operation of the driver.

[Control of Operation Pressure by Hydraulic Pressure Control Device: Automatic Driving Mode]

On the other hand, in the hydraulic pressure control device 1 according to the embodiment of the present invention, control is performed to generate the control operation pressure L2 at a time ta before the time t0 at which the required operation pressure L3 actually starts to vary, by using future information on the future time later than the current time, in the automatic driving mode.

For example, when the vehicle is automatically driven, the operation pressure control unit 10 can use the driving plan data (refer to FIG. 2) generated by the driving plan generation unit 20.

The driving plan data includes information on the required engine torque at the future time later than the current time.

In the embodiment, the required engine torque at each future time generated by the driving plan generation unit is determined in advance on the basis of the driving plan generated from the traveling route from the current position of the vehicle to the destination. However, it is preferable to change the required engine torque necessary for the future time each time, according to the vehicle state or the surrounding state of the vehicle.

As shown in FIG. 5, in the operation pressure control plan device 12, at the timing of the future time ta before the current time t0 at which the required engine torque L1 actually starts to increase, the pressure increase of the control operation pressure L2 (solid line in the figure) starts. As such, the operation pressure control plan device 12 can prevent the control operation pressure L2 from exceeding the required operation pressure L3 by starting the pressure increase of the control operation pressure L2 in advance.

Therefore, in the automatic driving mode, the margin value $\alpha 2$ ($\alpha 2 < \alpha 1$) smaller than the margin value $\alpha 1$ (refer to FIG. 4) in the manual driving mode may be the control operation pressure L2B (one-dot chain line in the lower diagram of FIG. 2) added to the control operation pressure L2.

In this case, the control operation pressure L2B to which the margin value $\alpha 2$ in the automatic driving mode has been added can be smaller than the control operation pressure L2A to which the margin value $\alpha 1$ in the manual driving mode has been added (L2B<L2A).

Furthermore, the operation pressure control plan device 12 can start control to increase the control operation pressure L2 in advance at a faster stage by increasing the number of future information (required engine torque at the future time) acquired in step 102. Therefore, it is desirable to increase the number of future information to be acquired in advance.

Further, as shown in FIG. 6, when the required engine torque L1 decreases, the operation pressure control plan device 12 performs control to decrease the control operation pressure L2 after the decrease of the required operation pressure L3 (required engine torque L1), so that it is possible to prepare for the subsequent variation of the required engine torque L1. In the present invention, it is possible to cope with the operation pressure control in this case by the processing in step 103.

[Control of Operation Pressure by Hydraulic Pressure Control Device: Override]

Next, an operation of the hydraulic pressure control device 1 according to the embodiment of the present invention when the vehicle is shifted (overridden) from the automatic driving mode to the manual driving mode will be described.

As shown in FIG. 7, in the automatic driving mode, the margin value $\alpha 2$ (refer to FIG. 5) to be added to the control operation pressure L2 generated by the operation pressure generation device 30 is a value smaller than the margin value $\alpha 1$ to be added to the control operation pressure L2 in the manual driving mode ($\alpha 2 < \alpha 1$). For this reason, the required operation pressure L3A may exceed the control operation pressure L2 after the driving mode of the vehicle is switched from the automatic driving mode to the manual driving mode.

Therefore, in the present invention, as described below, in the case of switching from the automatic driving mode to the manual driving mode, control is performed so that the required operation pressure L3B does not exceed the control operation pressure L2.

As shown in FIG. 7, for example, the case where the driving mode is switched to the manual driving mode when the operation of the accelerator pedal 70 by the driver is executed at the timing of the current time t0 in the automatic driving mode will be described as an example.

When it is detected that there is the operation of the accelerator pedal 70 by the driver at the current time t0 in the automatic driving mode, the engine control unit switches the driving mode of the vehicle from the automatic driving mode to the manual driving mode.

As shown in FIG. 7, as required engine torque L1A before the current time t0, the required engine torque using the driving plan data (refer to FIG. 2) including the future information generated by the driving plan generation unit 20 is used. In the operation pressure control unit 10, the control operation pressure L2 is controlled using the required engine torque of the future time later than the current time.

On the other hand, in the manual driving mode after the current time t0, required engine torque L1B at the current time calculated by the engine control unit 60 on the basis of the detection of the depression operation of the accelerator pedal 70 by the driver by the accelerator pedal sensor 71, which is required engine torque that does not use the future information, is used.

The hydraulic pressure control device 1 acquires the required engine torque L1 at the current time from the engine control unit 60, at the timing when the automatic driving mode is switched (overridden) to the manual driving mode (step 106 in FIG. 3), controls the operation pressure to the control operation pressure L2 to which the margin value $\alpha 1$ in the manual operation mode has been added (step 107 of FIG. 3), and transmits the information on the control operation pressure L2 generated by the operation pressure generation device 30 is transmitted to the engine control unit 60.

In addition, in the engine control unit 60, the required engine torque (required operation pressure L3B) by the operation of the driver is limited so as not to exceed the control operation pressure L2 generated by the operation pressure generation device 30.

The operation pressure control unit 10 performs control to suppress the required engine torque as described above at the timing when the automatic operation mode is switched (overridden) to the manual operation mode, so that it is possible to avoid the required operation pressure L3A from exceeding the control operation pressure L2, after the driving mode is switched to the manual driving mode (refer to hatching in the lower diagram of FIG. 7).

In the embodiment described above, the case where the operation pressure is used for control of the fastening force of the clutch 40 or the belt tension in the belt-type continuously variable transmission has been described by exemplifying the case where the operation pressure is supplied to a hydraulic chamber of the clutch 40 of the forward-reverse switching mechanism or a hydraulic chamber of a movable pulley of the transmission 41 as the hydraulic pressure control target. However, the hydraulic pressure control target is not limited to this.

As described above, in the embodiment, (1) in a hydraulic pressure control device 1 for a vehicle for controlling a line pressure or an operation pressure (hydraulic pressure) supplied to a clutch 40 or a transmission 41 (hydraulic pressure control target) provided in the vehicle, the hydraulic pressure control device 1 includes an operation pressure control unit 10 (hydraulic pressure setting device) that sets margin values $\alpha 1$ and $\alpha 2$ of the operation pressure (line pressure) supplied to hydraulic circuits 31 and 31 of the clutch 40 or the transmission 41, on the basis of a predetermined driving plan (refer to FIG. 2) in the case of driving the vehicle automatically.

According to this configuration, since the operation pressure control unit 10 can perform setting of the operation pressure (line pressure) using the future information such as the driving plan, the operation pressure control unit 10 may set the control operation pressure L2 supplied to the clutch 40 or the like to a value slightly larger than the required operation pressure L3 necessary for the operation of the clutch 40 or the like. As a result, since in accordance with the amount of possible reduction in the control operation pressure L2, the drive force of the vehicle required for the generation of the control operation pressure L2 can be reduced, fuel efficiency of the drive source (for example, the engine) of the vehicle can be improved, and a noise can be decreased.

(2) The hydraulic pressure control target is an automatic transmission provided in the vehicle, and the operation pressure control unit 10 (operation pressure control plan device 12) sets a margin value $\alpha 2$ of the control operation pressure L2 (line pressure) supplied to a hydraulic circuits 31 and 31 of the automatic transmission, on the basis of the predetermined driving plan (refer to FIG. 2) in the case of driving the vehicle automatically.

According to this configuration, the control operation pressure L2 in the case of driving the vehicle automatically is calculated by adding the margin value $\alpha 2$ based on the predetermined driving plan. Therefore, the control operation pressure L2 in the case of driving the vehicle automatically can be suppressed to a minimum value, the fuel efficiency of the drive source (for example, the engine) of the vehicle in the case of the automatic driving can be improved, and the noise can be decreased.

(3) The vehicle is configured so that any driving mode of an automatic driving mode and a manual driving mode is selected, the operation pressure control unit 10 (operation pressure setting device 13) sets the margin value $\alpha 2$ of the control operation pressure L2 (line pressure) on the basis of the driving plan, in the automatic driving mode, and the operation pressure control unit 10 sets the margin value $\alpha 1$ of the control operation pressure L2 (line pressure) on the basis of an operation (for example, a depression operation of the clutch 40) of a driver and sets the margin value so that the margin value $\alpha 2$ of the control operation pressure L2 set on the basis of the driving plan becomes a value ($\alpha 2 < \alpha 1$) smaller than the margin value $\alpha 1$ of the control operation pressure L2 set on the basis of the operation of the driver, in the manual driving mode.

According to this configuration, in the automatic driving mode, the margin value $\alpha 2$ smaller than the margin value $\alpha 1$ of the control operation pressure L2 added in the manual driving mode is added to the control operation pressure L2. Therefore, the control operation pressure L2 in the automatic driving mode can be smaller than the control operation pressure L2 in the manual driving mode, and the operation of the oil pump in the automatic driving mode can be suppressed.

(4) The hydraulic pressure control device further includes an engine control unit 60 (engine control device) which controls engine torque of the vehicle; and an operation pressure generation device 30 (hydraulic pressure generation device) which generates the control operation pressure L2 (operation pressure) supplied to the automatic transmission, wherein, when a driving mode of the vehicle is changed from the automatic driving mode to the manual driving mode, the operation pressure control unit 10 (hydraulic pressure control device) transmits information on the control operation pressure L2 generated by the operation pressure generation device 30 to the engine control unit 60, and the engine control unit 60 controls the engine torque on the basis of the information on the control operation pressure L2 generated by the operation pressure generation device 30.

When the driving mode of the vehicle is changed from the automatic driving mode to the manual driving mode, the margin value of the control operation pressure L2 in the automatic driving mode is small. For this reason, the required operation pressure L3 necessary for operating the clutch 40 or the like by the sudden operation of the driver may exceed the control operation pressure L2 generated by the operation pressure generation device 30.

According to this configuration, even after the driving mode of the vehicle is changed to the manual driving mode, the engine control unit 60 controls the drive source (for example, the engine) of the vehicle so that the required operation pressure L3 does not exceed the control operation pressure L2, on the basis of the information of the operation pressure control unit 10. Therefore, a sense of discomfort of the operation can be prevented from being given to the driver due to occurrence of a slip or the like of the clutch 40.

(5) The hydraulic pressure control device further includes a driving plan generation unit 20 (driving plan generation device) which generates the driving plan in the case of driving the vehicle automatically; a camera 22 (photographing device) which photographs the surroundings of the vehicle, and a DB 21 (map information acquisition device) which acquires map information around the vehicle, wherein the driving plan generation unit 20 generates the driving plan (refer to FIG. 2) on the basis of at least one of photographed image information acquired by the camera 22 and the map information acquired by the map DB.

According to this configuration, it is possible to use the camera (stereo camera) provided to be used for an advanced driver assistance system (ADAS) and the map information provided to be used for a global positioning system (GPS), and it is possible to generate the driving plan with a simple configuration using existing facilities.

(6) A hydraulic pressure control method for a vehicle for controlling a line pressure or an operation pressure (hydraulic pressure) supplied to a clutch 40 or a transmission 41 (hydraulic pressure control target) provided in the vehicle in which both an automatic driving mode and a manual driving mode are selectable, the hydraulic pressure control method including a step (step 101 of FIG. 3) of determining whether a driving mode of the vehicle is the automatic driving mode or the manual driving mode; a step (step 102 of FIG. 3) of acquiring values of required pieces of engine torque at a plurality of future times planned in advance by a driving plan (refer to FIG. 2) generated in the automatic driving mode; a step (step 103 of FIG. 3) of selecting the maximum required engine torque from the acquired required pieces of engine torque at the plurality of future times and calculating a control operation pressure L2 corresponding to a required operation pressure L3 necessary for transmitting the maximum required engine torque; a step (step 104 of FIG. 3) of adding a predetermined margin value α2 in the case of the automatic driving mode to the control operation pressure L2; and a step (step 105 of FIG. 3) of generating a the control operation pressure L2 (added control operation pressure) obtained by adding the margin value α2 to the control operation pressure L2.

According to this configuration, since setting of the operation pressure (line pressure) is performed using the future information such as the driving plan, the control operation pressure L2 supplied to the clutch 40 or the like may be set to a value slightly larger than the required operation pressure L3 necessary for the operation of the clutch 40 or the like. As a result, since in accordance with the amount of possible reduction in the control operation pressure L2, the drive force of the vehicle required to generation of the control operation pressure L2 can be reduced, the fuel efficiency of the drive source (for example, the engine) of the vehicle can be improved, and the noise can be decreased.

(7) The hydraulic pressure control method further includes a step (step 106 of FIG. 3) of calculating a control operation pressure L2 corresponding to a required operation pressure L3 necessary for transmitting required engine torque of a current time of the vehicle, when the driving mode of the vehicle is changed (overridden) from the automatic driving mode to the manual driving mode; and a step (step 107 of FIG. 3) of adding a predetermined margin value α1 in the case of the manual driving mode to the control operation pressure L2, wherein the engine control unit 60 controls the required engine torque on the basis of the control operation pressure L2 when the driving mode is changed to the manual driving mode (step 108).

When the driving mode of the vehicle is changed from the automatic driving mode to the manual driving mode, the margin value of the control operation pressure L2 in the automatic driving mode is small. For this reason, the required operation pressure L3 necessary for operating the clutch 40 or the like by the sudden operation of the driver may exceed the control operation pressure L2 generated by the operation pressure generation device 30.

According to this configuration, even after the driving mode of the vehicle is changed to the manual driving mode, the engine control unit 60 controls the drive source (for example, the engine) of the vehicle so that the required operation pressure L3 does not exceed the control operation pressure L2, on the basis of the information of the operation pressure control unit 10. Therefore, a sense of discomfort of the operation can be prevented from being given to the driver due to occurrence of a slip or the like of the clutch 40.

REFERENCE SIGNS LIST 1 hydraulic pressure control device
10 operation pressure control unit
11 input/output device
12 operation pressure control plan device
13 operation pressure setting device
14 CPU
20 driving plan generation unit
21 map DB
22 camera
30 operation pressure generation device
31 hydraulic circuit
40 clutch
41 transmission
50 engine
51 engine rotation speed sensor
60 engine control unit (ECU)
70 accelerator pedal
71 accelerator pedal sensor
72 electronic control throttle
73 fuel injection device

The invention claimed is:

1. A hydraulic pressure control device for a vehicle for controlling a hydraulic pressure supplied to a hydraulic pressure control target provided in the vehicle, the hydraulic pressure control device comprising:
   a hydraulic pressure setting device which sets a margin value of the hydraulic pressure supplied to the hydraulic pressure control target, on the basis of a predetermined driving plan in a case of driving the vehicle automatically.

2. The hydraulic pressure control device according to claim 1, wherein
   the hydraulic pressure control target is an automatic transmission provided in the vehicle, and the hydraulic pressure setting device sets a margin value of a line pressure supplied to a hydraulic circuit of the automatic transmission, on the basis of the predetermined driving plan in the case of driving the vehicle automatically.

3. The hydraulic pressure control device according to claim 2, wherein
   the vehicle is configured so that any driving mode of an automatic driving mode and a manual driving mode is selected,
   the hydraulic pressure setting device sets the margin value of the line pressure on the basis of the driving plan, in the automatic driving mode, and the hydraulic pressure setting device sets the margin value of the line pressure on the basis of an operation of a driver, and sets the margin value so that the margin value of the line pressure set on the basis of the driving plan becomes a value smaller than the margin value of the line pressure set on the basis of the operation of the driver, in the manual driving mode.

4. The hydraulic pressure control device according to claim 3, further comprising:

an engine control device which controls engine torque of the vehicle; and a hydraulic pressure generation device which generates an operation pressure supplied to the automatic transmission, wherein when a driving mode of the vehicle is changed from the automatic driving mode to the manual driving mode, the hydraulic pressure control device transmits information on the operation pressure generated by the hydraulic pressure generation device to the engine control device, and the engine control device controls the engine torque on the basis of the information on the operation pressure generated by the hydraulic pressure generation device.

5. The hydraulic pressure control device according to claim 1, further comprising:

a driving plan generation device which generates the driving plan in the case of driving the vehicle automatically;

a photographing device which photographs the surroundings of the vehicle, and a map information acquisition device which acquires map information around the vehicle, wherein the driving plan generation device generates the driving plan on the basis of at least one of photographed image information acquired by the photographing device and the map information acquired by the map information acquisition device.

6. A hydraulic pressure control method for a vehicle for controlling a hydraulic pressure supplied to a hydraulic pressure control target provided in the vehicle in which both an automatic driving mode and a manual driving mode are selectable, the hydraulic pressure control method comprising:

a step of determining whether a driving mode of the vehicle is the automatic driving mode or the manual driving mode;

a step of acquiring values of pieces of engine torque at a plurality of future times planned in advance by a driving plan generated in the automatic driving mode;

a step of selecting the maximum engine torque from the acquired pieces of engine torque at the plurality of future times and calculating a control operation pressure corresponding to a required operation pressure necessary for transmitting the maximum engine torque;

a step of adding a predetermined margin value in a case of the automatic driving mode to the control operation pressure; and a step of generating an added control operation pressure obtained by adding the margin value to the control operation pressure.

7. The hydraulic pressure control method according to claim 6, further comprising:

a step of calculating a control operation pressure corresponding to a required operation pressure necessary for transmitting engine torque of a current time of the vehicle, when the driving mode of the vehicle is changed from the automatic driving mode to the manual driving mode; and a step of adding a predetermined margin value in a case of the manual driving mode to the control operation pressure, wherein the engine control device controls the engine torque on the basis of the control operation pressure when the driving mode is changed to the manual driving mode.

* * * * *